United States Patent
Huang et al.

(10) Patent No.: US 10,810,214 B2
(45) Date of Patent: Oct. 20, 2020

(54) DETERMINING RELATED QUERY TERMS THROUGH QUERY-POST ASSOCIATIONS ON ONLINE SOCIAL NETWORKS

(71) Applicant: Facebook, Inc., Menlo Park, CA (US)

(72) Inventors: Chang Kuang Huang, San Jose, CA (US); Yi Zeng, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 394 days.

(21) Appl. No.: 15/820,966

(22) Filed: Nov. 22, 2017

(65) Prior Publication Data
US 2019/0155915 A1 May 23, 2019

(51) Int. Cl.
G06F 16/00 (2019.01)
G06F 16/2457 (2019.01)
G06F 16/248 (2019.01)
G06F 16/9535 (2019.01)
G06F 16/9536 (2019.01)
G06F 16/9532 (2019.01)
G06F 40/205 (2020.01)

(52) U.S. Cl.
CPC ...... *G06F 16/24578* (2019.01); *G06F 16/248* (2019.01); *G06F 16/9532* (2019.01); *G06F 16/9535* (2019.01); *G06F 16/9536* (2019.01); *G06F 40/205* (2020.01)

(58) Field of Classification Search
None
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |

(Continued)

OTHER PUBLICATIONS

U.S. Appl. No. 15/821,020, filed Nov. 22, 2017, Huang.
U.S. Appl. No. 15/611,667, filed Jun. 1, 2017, Pawar.
U.S. Appl. No. 15/702,558, filed Sep. 12, 2017, Gupta.

*Primary Examiner* — Debbie M Le
(74) *Attorney, Agent, or Firm* — Jordan IP Law, LLC

(57) ABSTRACT

In one embodiment, a method includes receiving an text query, identifying and ranking multiple content objects corresponding to character strings from the text query. A computing system determines the ranking based on an analysis of the association between the terms in the content objects and the n-grams in the query using term frequency-inverse document frequency (TF-IDF) scores of the terms. The computing system accesses a query-term index to determine the TF-IDF scores for the terms, wherein the query-term index includes multiple entries corresponding to multiple terms extracted from multiple prior queries. Each entry in the query-term index includes a query term, one or more related terms extracted from content objects of the online social network matching the prior query term, and a term frequency-inverse document frequency (TF-IDF) score for the respective related terms.

18 Claims, 8 Drawing Sheets

| Query-Term Index | | |
|---|---|---|
| Query Term | Related Term | TF-IDF Score |
| gal | gadot | 5.293 |
|  | miss universe | 3.911 |
|  | movie | 2.025 |
| gadot | gal | 5.155 |
|  | wonder woman | 4.154 |
|  | movie | 3.086 |
| gal gadot | wonder woman | 6.158 |
|  | movie | 5.535 |
|  | actress | 2.686 |
|  | miss universe | 2.629 |
| ⋮ | ⋮ | ⋮ |

(56) References Cited

U.S. PATENT DOCUMENTS

| | | | |
|---|---|---|---|
| 7,818,315 B2 * | 10/2010 | Cucerzan | G06F 16/951 707/723 |
| 7,836,044 B2 | 11/2010 | Kamvar | |
| 7,840,589 B1 | 11/2010 | Holt | |
| 8,024,328 B2 | 9/2011 | Dolin | |
| 8,027,990 B1 | 9/2011 | Mysen | |
| 8,055,673 B2 | 11/2011 | Churchill | |
| 8,060,639 B2 | 11/2011 | Smit | |
| 8,082,278 B2 | 12/2011 | Agrawal | |
| 8,112,529 B2 | 2/2012 | Van Den Oord | |
| 8,135,721 B2 | 3/2012 | Joshi | |
| 8,145,636 B1 | 3/2012 | Jeh | |
| 8,180,804 B1 | 5/2012 | Narayanan | |
| 8,185,558 B1 | 5/2012 | Narayanan | |
| 8,209,330 B1 | 6/2012 | Covell | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,301,639 B1 | 10/2012 | Myllymaki | |
| 8,306,922 B1 | 11/2012 | Kunal | |
| 8,312,056 B1 | 11/2012 | Peng | |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |
| 8,538,960 B2 | 9/2013 | Wong | |
| 8,572,129 B1 | 10/2013 | Lee | |
| 8,578,274 B2 | 11/2013 | Druzgalski | |
| 8,595,297 B2 | 11/2013 | Marcucci | |
| 8,601,027 B2 | 12/2013 | Behforooz | |
| 8,606,721 B1 | 12/2013 | Dicker | |
| 8,639,725 B1 | 1/2014 | Udeshi | |
| 8,732,208 B2 | 5/2014 | Lee | |
| 8,751,521 B2 | 6/2014 | Lee | |
| 8,775,324 B2 | 7/2014 | Zhu | |
| 8,782,080 B2 | 7/2014 | Lee | |
| 8,782,753 B2 | 7/2014 | Lunt | |
| 8,832,111 B2 | 9/2014 | Venkataramani | |
| 8,868,590 B1 | 10/2014 | Donneau-Golencer | |
| 8,868,603 B2 | 10/2014 | Lee | |
| 8,898,226 B2 | 11/2014 | Tiu | |
| 8,909,637 B2 | 12/2014 | Patterson | |
| 8,914,392 B2 | 12/2014 | Lunt | |
| 8,918,418 B2 | 12/2014 | Lee | |
| 8,924,406 B2 | 12/2014 | Lunt | |
| 8,935,255 B2 | 1/2015 | Sankar | |
| 8,935,261 B2 | 1/2015 | Pipegrass | |
| 8,935,271 B2 | 1/2015 | Lassen | |
| 8,949,232 B2 | 2/2015 | Harrington | |
| 8,949,250 B1 | 2/2015 | Garg | |
| 8,949,261 B2 | 2/2015 | Lunt | |
| 8,954,675 B2 | 2/2015 | Venkataramani | |
| 8,983,991 B2 | 3/2015 | Sankar | |
| 9,183,173 B2 * | 11/2015 | Yih | G06F 16/00 |
| 2002/0059199 A1 | 5/2002 | Harvey | |
| 2002/0086676 A1 | 7/2002 | Hendrey | |
| 2002/0196273 A1 | 12/2002 | Krause | |
| 2003/0154194 A1 | 8/2003 | Jonas | |
| 2003/0208474 A1 | 11/2003 | Soulanille | |
| 2004/0088325 A1 | 5/2004 | Elder | |
| 2004/0172237 A1 | 9/2004 | Saldanha | |
| 2004/0215793 A1 | 10/2004 | Ryan | |
| 2004/0243568 A1 | 12/2004 | Wang | |
| 2004/0255237 A1 | 12/2004 | Tong | |
| 2005/0091202 A1 | 4/2005 | Thomas | |
| 2005/0125408 A1 | 6/2005 | Somaroo | |
| 2005/0131872 A1 | 6/2005 | Calbucci | |
| 2005/0171955 A1 | 8/2005 | Hull | |
| 2005/0256756 A1 | 11/2005 | Lam | |
| 2006/0041597 A1 | 2/2006 | Conrad | |
| 2006/0117378 A1 | 6/2006 | Tam | |
| 2006/0136419 A1 | 6/2006 | Brydon | |
| 2006/0190436 A1 | 8/2006 | Richardson | |
| 2006/0218111 A1 | 9/2006 | Cohen | |
| 2007/0174304 A1 | 7/2007 | Shrufi | |
| 2007/0192293 A1 | 8/2007 | Swen | |
| 2007/0277100 A1 | 11/2007 | Sheha | |
| 2008/0005064 A1 | 1/2008 | Sarukkai | |
| 2008/0033926 A1 | 2/2008 | Matthews | |
| 2008/0072180 A1 | 3/2008 | Chevalier | |
| 2008/0114730 A1 | 5/2008 | Larimore | |
| 2008/0183694 A1 | 7/2008 | Cane | |
| 2008/0183695 A1 | 7/2008 | Jadhav | |
| 2008/0270615 A1 | 10/2008 | Centola | |
| 2009/0006543 A1 | 1/2009 | Smit | |
| 2009/0054043 A1 | 2/2009 | Hamilton | |
| 2009/0094200 A1 | 4/2009 | Baeza-Yates | |
| 2009/0164408 A1 | 6/2009 | Grigorik | |
| 2009/0164431 A1 | 6/2009 | Zivkovic | |
| 2009/0164929 A1 | 6/2009 | Chen | |
| 2009/0197681 A1 | 8/2009 | Krishnamoorthy | |
| 2009/0222348 A1 | 9/2009 | Ransom | |
| 2009/0228296 A1 | 9/2009 | Ismalon | |
| 2009/0259624 A1 | 10/2009 | DeMaris | |
| 2009/0259646 A1 | 10/2009 | Fujita | |
| 2009/0265326 A1 | 10/2009 | Lehrman | |
| 2009/0271370 A1 | 10/2009 | Jagadish | |
| 2009/0271374 A1 | 10/2009 | Korn | |
| 2009/0276414 A1 | 11/2009 | Gao | |
| 2009/0281988 A1 | 11/2009 | Yoo | |
| 2009/0299963 A1 | 12/2009 | Pippori | |
| 2010/0049802 A1 | 2/2010 | Raman | |
| 2010/0057723 A1 | 3/2010 | Rajaram | |
| 2010/0082695 A1 | 4/2010 | Hardt | |
| 2010/0125562 A1 | 5/2010 | Nair | |
| 2010/0145771 A1 | 6/2010 | Fligler | |
| 2010/0179929 A1 | 7/2010 | Yin | |
| 2010/0197318 A1 | 8/2010 | Petersen | |
| 2010/0228744 A1 | 9/2010 | Craswell | |
| 2010/0235354 A1 | 9/2010 | Gargaro | |
| 2010/0250526 A1 | 9/2010 | Prochazka | |
| 2010/0321399 A1 | 12/2010 | Ellren | |
| 2011/0004609 A1 | 1/2011 | Chitiveli | |
| 2011/0022602 A1 | 1/2011 | Luo | |
| 2011/0078166 A1 | 3/2011 | Oliver | |
| 2011/0087534 A1 | 4/2011 | Strebinger | |
| 2011/0137902 A1 | 6/2011 | Wable | |
| 2011/0184981 A1 | 7/2011 | Lu | |
| 2011/0191371 A1 | 8/2011 | Elliott | |
| 2011/0196855 A1 | 8/2011 | Wable | |
| 2011/0231296 A1 | 9/2011 | Gross | |
| 2011/0276396 A1 | 11/2011 | Rathod | |
| 2011/0313992 A1 | 12/2011 | Groeneveld | |
| 2011/0320470 A1 | 12/2011 | Williams | |
| 2012/0042020 A1 | 2/2012 | Kolari | |
| 2012/0047147 A1 | 2/2012 | Redstone | |
| 2012/0059708 A1 | 3/2012 | Galas | |
| 2012/0110080 A1 | 5/2012 | Panyam | |
| 2012/0136852 A1 | 5/2012 | Geller | |
| 2012/0166432 A1 | 6/2012 | Tseng | |
| 2012/0166433 A1 | 6/2012 | Tseng | |
| 2012/0179637 A1 | 7/2012 | Juan | |
| 2012/0185472 A1 | 7/2012 | Ahmed | |
| 2012/0185486 A1 | 7/2012 | Voigt | |
| 2012/0209832 A1 | 8/2012 | Neystadt | |
| 2012/0221581 A1 | 8/2012 | Narayanan | |
| 2012/0271831 A1 | 10/2012 | Narayanan | |
| 2012/0278127 A1 | 11/2012 | Kirakosyan | |
| 2012/0284329 A1 | 11/2012 | Van Den Oord | |
| 2012/0290950 A1 | 11/2012 | Rapaport | |
| 2012/0310922 A1 | 12/2012 | Johnson | |
| 2012/0311034 A1 | 12/2012 | Goldband | |
| 2012/0317088 A1 | 12/2012 | Pantel | |
| 2012/0331063 A1 | 12/2012 | Rajaram | |
| 2013/0031106 A1 | 1/2013 | Schechter | |
| 2013/0031113 A1 | 1/2013 | Feng | |
| 2013/0041876 A1 | 2/2013 | Dow | |
| 2013/0066876 A1 | 3/2013 | Raskino | |
| 2013/0073400 A1 | 3/2013 | Heath | |
| 2013/0085970 A1 | 4/2013 | Karnik | |
| 2013/0086024 A1 | 4/2013 | Liu | |
| 2013/0086057 A1 | 4/2013 | Harrington | |

(56) References Cited

U.S. PATENT DOCUMENTS

| | | |
|---|---|---|
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniavskii |
| 2017/0046390 A1 | 2/2017 | Jain |
| 2017/0083523 A1 | 3/2017 | Philip |

\* cited by examiner

| Query-Term Index |||
|---|---|---|
| Query Term | Related Term | TF-IDF Score |
| gal | gadot | 5.293 |
| | miss universe | 3.911 |
| | movie | 2.025 |
| gadot | gal | 5.155 |
| | wonder woman | 4.154 |
| | movie | 3.086 |
| gal gadot | wonder woman | 6.158 |
| | movie | 5.535 |
| | actress | 2.686 |
| | miss universe | 2.629 |
| ⋮ | ⋮ | ⋮ |

*FIG. 3*

| Real-Time Query-Post Log ||
|---|---|
| Query Term | Related Term |
| donald | duck |
| donald | huey |
| donald | dewey |
| donald | louie |
| donald | trump |
| donald | louie |
| duck | donald |
| duck | huey |
| duck | dewey |
| duck | louie |
| ⋮ | ⋮ |

*FIG. 4*

DETERMINING RELATED QUERY TERMS THROUGH QUERY-POST ASSOCIATIONS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may improve the quality of search results based on related terms of search results corresponding to query terms. The related terms may be identified by using keyword recognition and term frequency-inverse document frequency (TF-IDF) analysis of the associations between search results and search queries. As an example, the social-networking system may identify related terms in the following way. In response to search queries from users over a prior time window, the social-networking system may record the content objects (e.g., posts) selected (e.g., clicked on) by users corresponding to the search queries in a query-term index. The social-networking system may associate the selected posts to the search queries. The social-networking system may then perform an analysis of these query-post associations using TF-IDF scores to identify terms in the posts related to the terms in the search queries. The TF-IDF scores, which may also be recorded in the query-term index, identify terms that appear with higher frequency in a given document as compared to a corpus of documents (e.g., all posts on the online social network posted within a given time window).

In particular embodiments, the social-networking system may use the identified related terms to rank the posts matching a query at a current time (i.e., at the time the query is received). For example, a user may search with a query "gal gadot" and the social-networking system may identify posts matching the query. The query-post TF-IDF analysis using the query-term index may determine that the terms "wonder woman" and "movie" are important terms within the corpus of matching posts. The social-networking system may then rank posts containing these terms on top of the ranking list. Although this example is described in the context of post-type objects, the query-post TF-IDF analysis may be applied to any content objects containing text (e.g., user profiles, news, articles, comments on audio/visual content, text extracted by speech recognition on audio/visual content, etc.). Besides being used for ranking search results, using the query-term index to identify related terms and their corresponding TF-IDF scores may be also used in other applications including query rewriting, query suggestions (e.g., for a typeahead process), or other suitable applications.

In particular embodiments, the social-networking system may receive, from a client system associated with a first user of an online social network, a search query comprising a character string. The search query may be parsed to identify one or more n-grams. In particular embodiments, the social-networking system may access a query-term index comprising a plurality of entries corresponding to a plurality of terms extracted from a plurality of prior queries. Each entry in the query-term index may comprise a query term, one or more related terms extracted from content objects of the online social network matching the query term, and a TF-IDF score for the respective related terms. Additionally, the social-networking system may search the query-term index to identify one or more entries corresponding to one or more query terms that match the one or more n-grams of the search query. In particular embodiments, the social-networking system may identify a plurality of content objects associated with the online social network that match the search query, each content object comprising one or more terms. The social-networking system may rank the identified content objects based on the TF-IDF score from each identified entry of the query-term index for each related term that matches a term contained in the respective content object. In particular embodiments, the social-networking system may further send to the client system instructions for presenting one or more search results corresponding to one or more of the identified content objects, respectively. The search results may be presented in an order based on the ranking of the corresponding content objects.

In particular embodiments, the social-networking system may improve the quality of search results based on terms of search results that are predictive of an increased engagement rate of users on an online social network. These terms may be identified by using a statistical analysis of associations between search results and search queries based on a real-time query-post log. As an example, the social-networking system may identify these terms in the following way. In response to search queries from users over a recent short time window, e.g., one week, the social-networking system may record the content objects (e.g., posts) selected (e.g., clicked on) by users corresponding to the search queries in the real-time query-post log. The social-networking system may associate the selected posts to the search queries. The social-networking system may then perform a statistical analysis of these query-post associations based on correlation coefficient calculated for the terms to identify terms in posts that are statistically significant in predicting user interaction with these posts. The social-networking system may score the posts based on the statistical analysis. In particular embodiments, the social-networking system may use the scores to rank the posts matching a query at a current time (i.e., at the time the query is received). For example, a user may search with a query "donald duck" and the social-networking system may identify posts matching the query. The social-networking system may determine, using the real-time query-post log, that the terms "huey", "dewey", and "louie" are significant in predicting user interaction based on a statistical analysis. The social-networking system may then score the posts based on the statistical analysis and rank the posts accordingly. Although this example is described in the context of post-type objects, the statistical analysis may be applied to any content objects containing text (e.g., user profiles, news, articles, comments on audio/visual content, text extracted by speech recognition on audio/visual content, etc.). Besides being used for ranking search results, using the real-time query-post log to identify terms and their correlation coefficients may be also used in other applications including query rewriting, query suggestions (e.g., for a typeahead process), identifying trending topics, optimizing content generation (e.g., composing posts), or other suitable applications.

In particular embodiments, the social-networking system may receive, from a client system associated with a first user of an online social network, a search query comprising a character string. The search query may be parsed to identify one or more n-grams. In particular embodiments, the social-networking system may access a real-time query-post log comprising a plurality of entries corresponding to a plurality of terms extracted from a plurality of prior queries over a recent time window. Each entry in the query-post log may comprise a query term and a related term extracted from content objects of the online social network matching the query term. In particular embodiments, the social-networking system may identify a plurality of content objects associated with the online social network that match the search query, wherein each content object comprises one or more terms. The social-networking system may calculate, in real time, correlation coefficients for the terms of the content object with respect to each of the n-grams of the search query. The correlation coefficient for each term of the content object may be based on a count of entries in the query-post log comprising a related term matching the term of the content object and a query term matching the respective n-gram of the search query. The identified content objects may be then ranked based on the correlation coefficients of the terms of the content objects. In particular embodiments, the social-networking system may then send, to the client system, instructions for presenting one or more search results corresponding to one or more of the identified content objects, respectively. The search results may be presented in an order based on the ranking of the corresponding content objects.

The embodiments disclosed herein may allow a social-networking system to improve the ranking of search results by presenting, for example, the most relevant, comprehensive, and/or popular results in response to a user's search query. For example, a user may submit a search query containing only a short character string (e.g., a unigram). Traditional search algorithms may retrieve content objects that match the character string. However, the results may be narrowly focused on the character string and the search algorithms may fail to return (or properly rank) relevant results with a broader focus that may also characterize the popular or trending topics among a plurality of users on an online social network. As an example, if a user submits a query "donald", a traditional search algorithm may return many content objects containing the term "donald". The results may be focused on matching the exact term "donald" and may be too generic, for example, returning results containing the terms "donald trump" and "donald duck". However, based on an analysis of query-post associations, the social-networking system may determine that a user searching for the term "donald" may be more interested in content objects containing the term "donald trump". By contrast, the embodiments disclosed herein use multiple techniques to identify related terms and popular content objects to return search results that may be more relevant to a user's interest. As for the above example, the social-networking system may return content objects comprising "donald trump" if an analysis of query-post associations determined that it is currently a popular topic among users on an online social network. The social-networking system may also identify other related terms such as "politics", "president", "immigration", "wall", etc., and return content objects containing these related terms in the search results ranked in an order of their popularity and/or correlation with respect to the query term "donald".

Certain technical challenges exist for achieving the goal of ranking the search results by presenting the most relevant, comprehensive, and/or popular results in response to a user's search query in a timely and efficient manner with respect to computer processing resources (e.g., low latency, low processor utilization). One technical challenge includes, for a given search query, identifying terms extracted from a large set of content objects (e.g., billions of posts accessed in response to billions of queries) that are related to the terms appearing in the search query. The solutions presented by the embodiments disclosed herein to address the above challenge are a combination of sanitation, normalization, and parsing techniques to process the content objects in a timely and efficient way. Another technical challenge includes developing effective mechanisms to analyze the associations between the keywords of the search query and the related terms of the content objects to capture most relevant, comprehensive, and/or popular content objects. The embodiments disclosed herein present various technical solutions to address this challenge. The first technical solution is a statistical analysis based on a query-term index comprising a plurality of terms extracted from a plurality of prior queries, their related terms extracted from content objects of the online social network matching the prior query term, and a term frequency-inverse document frequency (TF-IDF) score for the respective related terms. This statistical analysis, which may occur during an offline process, may enable the social-networking system to process the content objects in batch-mode efficiently as the TF-IDF scores of related terms are readily available for analysis. The second technical solution is a statistical analysis based on real-time calculation of correlation coefficients of related terms according to a real-time query-post log comprising a plurality of terms extracted from a plurality of prior queries and their related terms extracted from content objects of the online social network matching the prior query term. This statistical analysis, which may occur at query-time, may enable the social-networking system to capture breaking news or trending topics at a current time, as the calculation of correlation coefficients of related terms is updated rapidly in real time.

Certain embodiments disclosed herein may provide one or more technical advantages. A technical advantage of the embodiments may include limiting the bandwidth used between a user and a social-networking system by providing improved search results that decrease the number of additional searches performed by the user to identify the desired search results. Another technical advantage of the embodiments may include providing search results that both match a user's search query and reflect the popular topics among other users on an online social network. Another technical advantage of the embodiments may include organizing breaking news and trending topics to effectively provide them to a user corresponding to a user's search query. Another technical advantage of the embodiments may include providing time-correlated search results to a user as a query-term index or real-time query-post log can be generated based on varying time window with respect to a current time. Another technical advantage of the embodiments may include providing search results that are personalized to a user based on the user's social-graph information, including connections to other users, geographic region and etc. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 illustrates an example query-term index.

FIG. 4 illustrates an example real-time query-post log.

DESCRIPTION OF EXAMPLE EMBODIMENTS

System Overview

Figure 1:
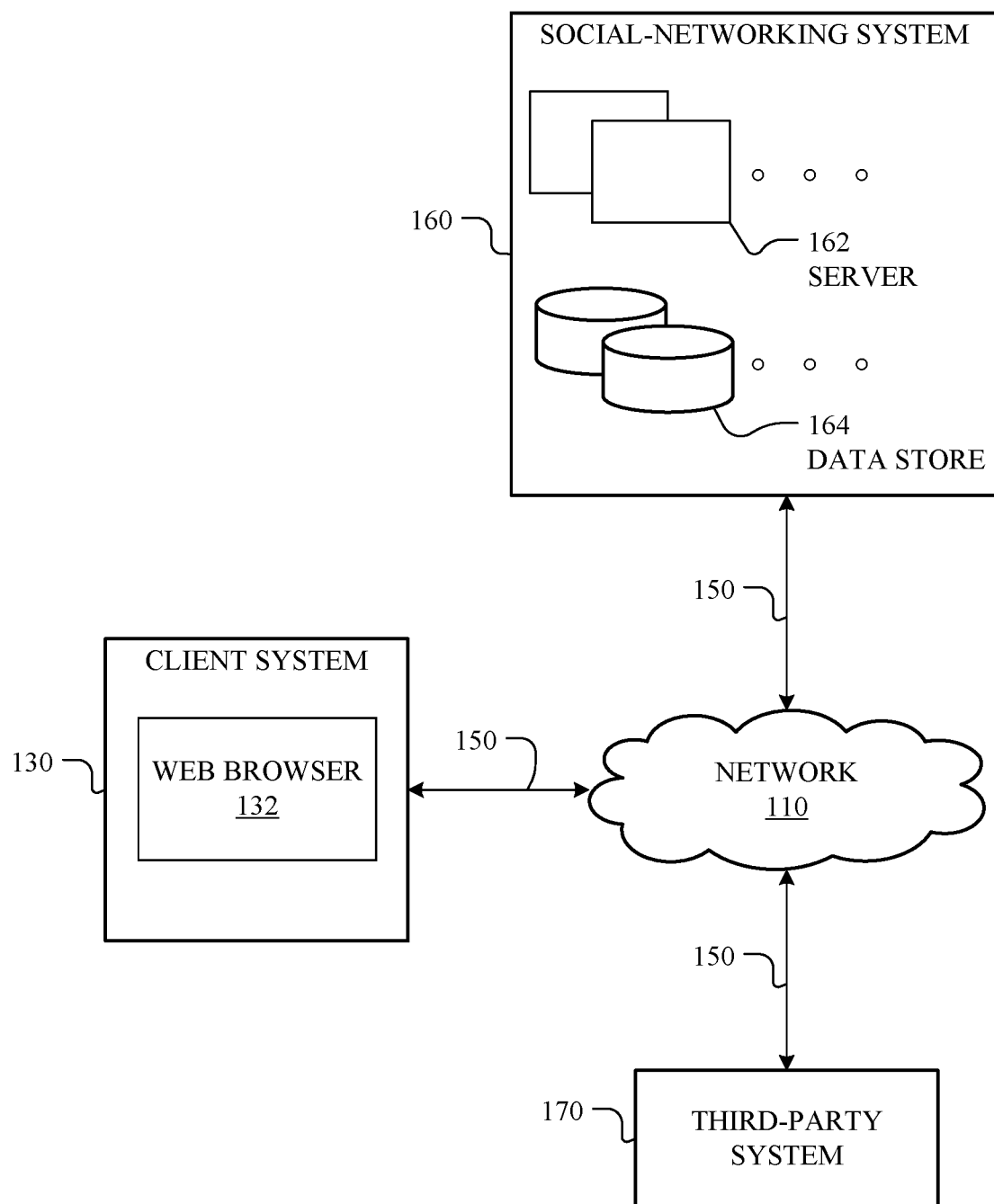
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
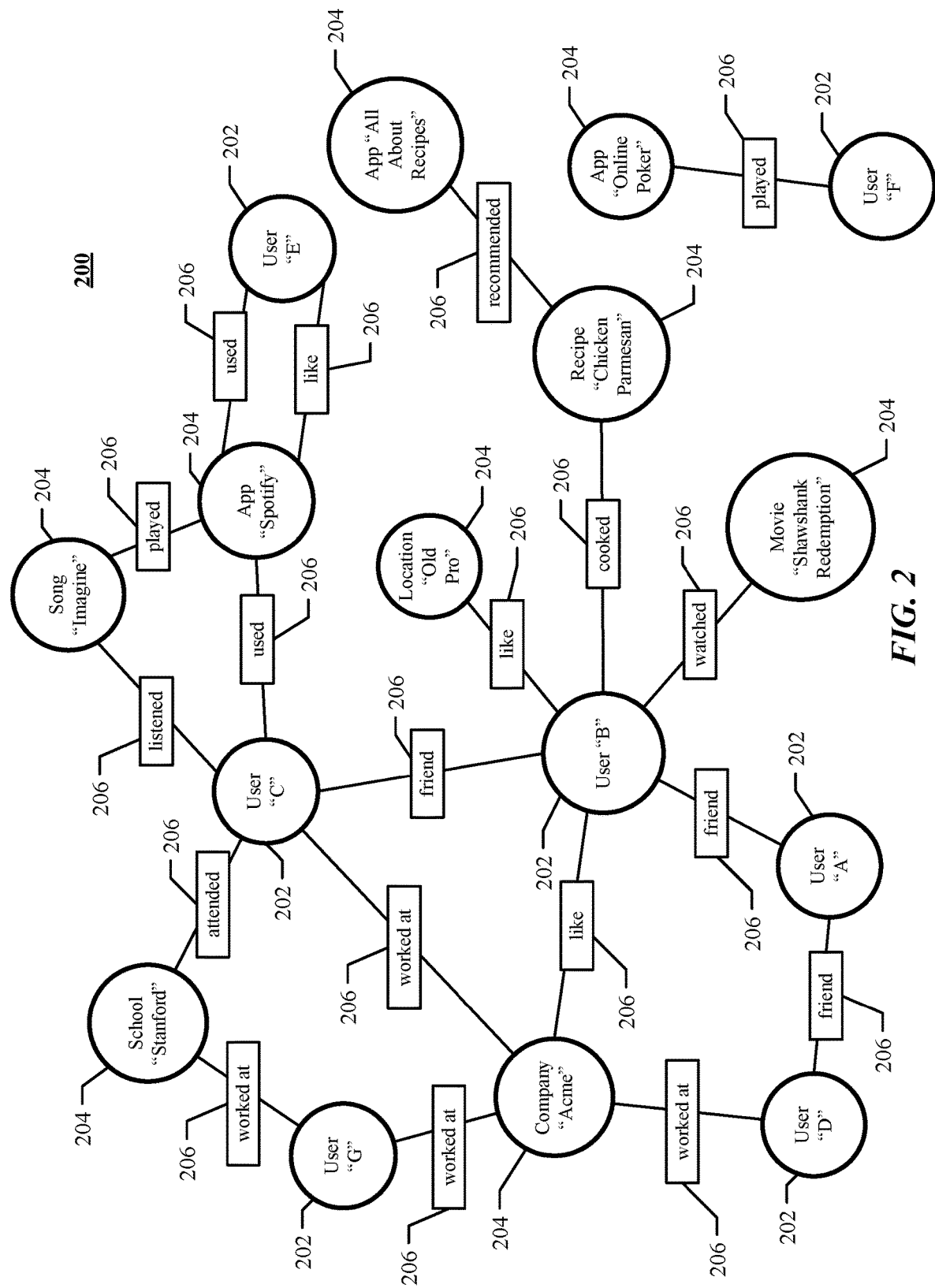
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Query-Term Indexes

In particular embodiments, the social-networking system 160 may improve the quality of search results based on related terms of search results corresponding to query terms. The related terms may be identified by using keyword recognition and term frequency-inverse document frequency (TF-IDF) analysis of the associations between search results and search queries. As an example, the social-networking system 160 may identify related terms in the following way. In response to search queries from users over a prior time window, the social-networking system 160 may record the content objects (e.g., posts) selected (e.g., clicked on) by users corresponding to the search queries in a query-term index. The social-networking system 160 may associate the selected posts to the search queries. The social-networking system 160 may then perform an analysis of these query-post associations using TF-IDF scores to identify terms in the posts related to the terms in the search queries. The TF-IDF scores, which may also be recorded in the query-term index, identify terms that appear with higher frequency in a given document as compared to a corpus of documents (e.g., all posts on the online social network posted within a given time window). In particular embodiments, the social-networking system 160 may use the identified related terms to rank the posts matching a query at a current time (i.e., at the time the query is received). For example, a user may search with a query "gal gadot" and the social-networking system 160 may identify posts matching the query. The query-post TF-IDF analysis using the query-term index may determine that the terms "wonder woman" and "movie" are important terms within the corpus of matching posts. The social-networking system 160 may then rank posts containing these terms on top of the ranking list. Although this example is described in the context of post-type objects, the query-post TF-IDF analysis may be applied to any content objects containing text (e.g., user profiles, news, articles, comments on audio/visual content, text extracted by speech recognition on audio/visual content, etc.). The embodiments disclosed herein may allow a social-networking system 160 to improve the ranking of search results by presenting, for example, the most relevant, comprehensive, and/or popular results in response to a user's search query. In addition, since improved search results may decrease the number of additional searches performed by the user to identify the desired search results, the embodiments disclosed herein may have another technical advantage of limiting the bandwidth used between a user and a social-networking system 160. Besides being used for ranking search results, using the query-term index to identify related terms and their corresponding TF-IDF scores may be also used in other applications including query rewriting, query suggestions (e.g., for a typeahead process), or other suitable applications. Although this disclosure describes improving the quality of search results based on a query-term index in a particular manner, this disclosure contemplates improving the quality of search results based on a query-term index in any suitable manner.

FIG. 3 illustrates an example query-term index 300. In particular embodiments, the social-networking system 160 may access a query-term index 300 comprising a plurality of entries corresponding to a plurality of terms extracted from a plurality of prior queries. Each entry in the query-term index 300 may comprise one or more of: (1) a query term, (2) one or more related terms extracted from content objects of the online social network matching the query term, or (3) a TF-IDF score for the respective related terms. Entries in the query-term index 300 may further comprise other suitable information related to the query terms or the related terms. As an example and not by way of limitation, the query-term index 300 illustrated in FIG. 3 includes several entries. The first (left) column indicates the query terms, the second (middle) column indicates the related terms, and the third (right) column indicates the TF-IDF scores for the related terms. Although this disclosure describes each entry of the query-term index 300 as having three components, this disclosure contemplates each entry comprising any suitable number of components. For example, each entry in the query-term index 300 may also comprise time stamps or decay factors indicating how long the related terms have been existing in the query-term index 300. Each entry in the query-term index 300 may also comprise a category tag indicating which category the query term and related terms belong to for topic organization. As an example and not by way of limitation, the category tag may indicate that the query term and related terms belong to one or more of entertainment, politics, science and technology, sports, or other suitable categories. Each entry may also comprise geographic region information about the content objects or the authors that authored the content objects. The geographic region information may be used for regional filtering. The social-networking system 160 may access the query-term index 300 to obtain the TF-IDF scores of the one or more related terms. Although this disclosure describes a particular query-term index comprising particular information, this disclosure contemplates any suitable query-term index comprising any suitable information. More information on search indexes may be found in U.S. patent application Ser. No. 14/858,195, filed 18 Sep. 2015, and U.S. patent application Ser. No. 15/680,096, filed 17 Aug. 2017, which are incorporated by reference.

In particular embodiments, the social-networking system 160 may generate the query-term index 300 in the following way. The social-networking system 160 may first record, in a query-post log, from a plurality of client systems 130 associated with a plurality of users of an online social network, a plurality of prior search queries each comprising one or more prior query terms, over a time window. The time window may be a pre-specified period of time prior to a current time and the length of the period may vary depending on the particular embodiment. As an example and not by way of limitation, the time window may be one hour, 24 hours, one week, two weeks, one month, or another suitable length of time. A shorter or more recent period of time may provide more focused or recently-biased results whereas a longer or less recent period of time may provide less focused or more generic results. As a result, the embodiments disclosed herein may have a technical advantage of providing time-correlated search results to a user. As an example and not by way of limitation, a plurality of users may submit a search query for "golden state warriors". The social-networking system 160 may determine a time window to record these queries in the query-post log. During the NBA playoffs (which typically occur in May and June), a time window that is limited to just the previous week may bias results to including discussion of just the previous few games. A time window including the previous month may show discussions of the team in general, or include discussion of other games. The social-networking system 160 may then record, in the query-post log, for each prior search query, one or more prior content objects accessed responsive to the prior search query, each prior content object comprising one or more related terms. As an example and not by way of limitation, continuing with the previous example, a plurality of users may click on one or more content objects such as news, articles, posts, videos, etc., returned by the social-networking system 160 corresponding to the search query "golden state warriors" submitted at the beginning of June. Each content object may comprise one or more related terms. The social-networking system 160 may record these content objects in the query-post log corresponding to the search query. The social-networking system 160 may further calculate, for each pair of query terms and related terms, a TF-IDF score for the related term with respect to the prior content objects matching the query terms of the pair. For example, "champions" may be a related term of "golden state warriors". The social-networking system 160 may calculate a TF-IDF score for "champions" based on the query-post log. The social-networking system 160 may then store, in the query-term index 300, a plurality of entries. Each entry may comprise: (1) one of the one or more prior query terms, (2) one or more related terms from the prior content objects accessed responsive to the prior search query comprising the respective prior query terms, and (3) the calculated TF-IDF score for the respective related terms. The query-term index 300 may list the related terms ranked according to their TF-IDF scores. For example, the query-term index 300 illustrated in FIG. 3 indicates that for query term "gal godat", "wonder woman", "movie", "actress", and "miss universe" are four related terms with different TF-IDF scores. When a user submits a query containing "gal gadot", the social-networking system 160 may identify a plurality of content objects matching "gal gadot". The social-networking system 160 may rank the content objects containing the related terms "wonder woman" and "movie" on top of the ranking list because these two related terms have higher TF-IDF scores compared to other related terms according to the query-term index 300. Although this disclosure describes generating particular query-term indexes in a particular manner, this disclosure contemplates generating any suitable query-term indexes in any suitable manner.

In particular embodiments, the social-networking system 160 may identify a plurality of content objects associated with the online social network that match the search query. Each content object may comprise one or more terms (e.g., text strings in a post). In particular embodiments, the social-networking system 160 may rank the identified content objects in the following way based on the TF-IDF score from each identified entry of the query-term index 300 for each related term that matches a term contained in the respective content object. The social-networking system 160 may first determine, for each related term from each identified entry in the query-term index 300, a weight for the related term based on the TF-IDF score of the related term. The social-networking system 160 may then tune a ranking algorithm by applying the determined weight of each related term to the ranking algorithm. The social-networking system 160 may subsequently rank the identified content objects using the tuned ranking algorithm. The ranking may be based on whether one or more of the related terms are contained in the content object and the respective weights of the one or more related terms. As an example and not by way of limitation, the social-networking system 160 may tune a ranking algorithm based on the query-term index 300 illustrated in FIG. 3 as follows. The social-networking system 160 may determine similar weights, e.g., 0.25, 0.25, 0.2, and 0.2, for the related terms "wonder woman", "movie", "actress", and "miss universe", tune the ranking algorithm, and rank the identified content objects using the tuned algorithm. In this way, the social-networking system 160 may focus on a broader representation of related terms, in other words, high number of distinct related terms. As another example and not by way of limitation, the social-networking system 160 may determine higher weights, e.g., 0.4, for the related terms "wonder woman" and "movie" but lower weights, e.g., 0.05, for "actress" and "miss universe", tune the ranking algorithm, and rank the identified content objects using the tuned algorithm. In this way, the social-networking system 160 may focus on a more selective representation of related terms, in other words, high frequency of a low number of related terms. Although this disclosure describes identifying and ranking particular content objects in a particular manner, this disclosure contemplates identifying and ranking any suitable content objects in any suitable manner.

In particular embodiments, the social-networking system 160 may use the following example pseudo code to determine weights for each related term:

```
function determine_weight as (
    SELECT
        one or more query terms from a.query_term as variable
        query_term,
        one or more related terms from a.related_term as variable
        related_term,
        a pre-specified weight-vector a.weight as variable weight
        for related terms
    FROM (
        SELECT
            query_term as query_term,
            related_term as related_term,
            weight as weight
        FROM <QUERY_POST_LOG>
        WHERE {a content filter is applied}
    ) a
    JOIN valid_related_term v %v is the variable for valid related
    terms%
    ON a.related_term = v.related_term %selects only the valid
    related terms%
    GROUP BY a.query_term, a.related_term %associates related terms
    with the query_term%
        HAVING
            A condition to ignore a related term if it is a sub-term of
            a query term
)
```

In particular embodiments, the social-networking system 160 may rank the identified content objects using the query-term index 300 in the following way. The social-networking system 160 may first determine, for each related term from each identified entry in the query-term index 300 corresponding to a query term that matches a unigram of the search query, a weight of a first pre-specified value for the related term corresponding to the query term matching the unigram. The social-networking system 160 may also determine, for each related term from each identified entry in the query-term index 300 corresponding to a query term that matches a bigram of the search query, a weight of a second pre-specified value for the related term corresponding to the query term matching the bigram. The social-networking system 160 may then tune a ranking algorithm by applying the determined weight of the first or second pre-specified values of each related term to the ranking algorithm. The social-networking system 160 may subsequently rank the identified content objects using the tuned ranking algorithm. The ranking may be based on whether one or more of the related terms are contained in the content object and the respective weights of the first or second pre-specified values of the one or more related terms. In particular embodiments, the social-networking system 160 may determine the first pre-specified value to be zero, which may indicate that the social-networking system 160 ignores the contribution of the unigrams. In alternative embodiments, the social-networking system 160 may determine the second pre-specified value to be zero, which may indicate that the social-networking system 160 treats the unigrams as separate, but related parts of the query. As an example and not by way of limitation, the social-networking system 160 may tune a ranking algorithm based on the query-term index 300 illustrated in FIG. 3 as follows. The social-networking system 160 may determine a weight of a first pre-specified value for the related terms "gal" and "gadot" as they correspond to the query terms "gadot" and "gal" matching the unigrams "gadot" and "gal". The social-networking system 160 may determine a weight of a second pre-specified value for the related terms "wonder woman", "movie", "actress", and "miss universe" as they correspond to the query term "gal gadot" matching the bigram "gal gadot". The social-networking system 160 may then tune the ranking algorithm with the weighted related terms, and rank the identified content objects using the tuned ranking algorithm. For example, social-networking system 160 may determine higher weights, e.g., 0.4, for the related terms "wonder woman", "movie", "actress", and "miss universe" but lower weights, e.g., 0.1, for the related terms "gal" and "gadot". In this way, the social-networking system 160 may characterize that the bigrams dominate the search query while at the same time consider important terms corresponding to the unigrams. Although this disclosure describes ranking particular content objects in a particular manner, this disclosure contemplates ranking any suitable content objects in any suitable manner.

Real-Time Query-Post Logs

In particular embodiments, the social-networking system 160 may improve the quality of search results based on terms of search results that are predictive of an increased engagement rate of users on an online social network. These terms may be identified by using a statistical analysis of associations between search results and search queries based on a real-time query-post log. As an example, the social-networking system 160 may identify these terms in the following way. In response to search queries from users over a recent short time window, e.g., one week, the social-networking system 160 may record the content objects (e.g., posts) selected (e.g., clicked on) by users corresponding to the search queries in the real-time query-post log. The social-networking system 160 may associate the selected posts to the search queries. The social-networking system 160 may then perform a statistical analysis of these query-post associations based on correlation coefficient calculated for the terms to identify terms in posts that are statistically significant in predicting user interaction with these posts. The social-networking system 160 may score the posts based on the statistical analysis. In particular embodiments, the social-networking system 160 may use the scores to rank the posts matching a query at a current time (i.e., at the time the query is received). For example, a user may search with a query "donald duck" and the social-networking system 160 may identify posts matching the query. The social-networking system 160 may determine, using the real-time query-post log, that the terms "huey", "dewey", and "louie" are significant in predicting user interaction based on a statistical analysis. The social-networking system 160 may then score the posts based on the statistical analysis and rank the posts accordingly. Although this example is described in the context of post-type objects, the statistical analysis may be applied to any content objects containing text (e.g., user profiles, news, articles, comments on audio/visual content, text extracted by speech recognition on audio/visual content, etc.). The embodiments disclosed herein may allow a social-networking system 160 to improve the ranking of search results by presenting, for example, the most relevant, comprehensive, and/or popular results in response to a user's search query. In addition, since improved search results may decrease the number of additional searches performed by the user to identify the desired search results, the embodiments disclosed herein may have another technical advantage of limiting the bandwidth used between a user and a social-networking system 160. Besides being used for ranking search results, using the real-time query-post log to identify terms and their correlation coefficients may be also used in other applications including query rewriting, query suggestions (e.g., for a typeahead process), identifying trending topics, optimizing content generation (e.g., composing posts), or other suitable applications. Although this disclosure describes improving the quality of search results based on a real-time query-post log in a particular manner, this disclosure contemplates improving the quality of search results based on a real-time query-post log in any suitable manner.

FIG. 4 illustrates an example real-time query-post log 400. In particular embodiments, the social-networking system 160 may access a real-time query-post log 400 comprising a plurality of entries corresponding to a plurality of terms extracted from a plurality of prior queries over a recent time window. Each entry in the query-post log 400 may comprise one or more of: (1) a query term, or (2) a related term extracted from a content object of the online social network matching the prior query from which the query term was extracted, the content object having been accessed responsive to the prior query. Entries in the real-time query-post log 400 may further comprise other suitable information related to the query terms or the related terms. As an example and not by way of limitation, the real-time query-post log 400 illustrated in FIG. 4 includes several entries. The first column (left) indicates the query terms, and the second column (right) indicates the related terms. Although this disclosure describes each entry of the real-time query-post log 400 as having two components, this disclosure contemplates each entry comprising any suitable number of components. For example, each entry in the real-time query-post log 400 may also comprise a time stamp or a decay factor indicating how long the related term has been existing in the real-time query-post log 400. Each entry in the real-time query-post log 400 may also comprise a category tag indicating which category the query term and related term belong to for topic organization. As an example and not by way of limitation, the category tag may indicate the query term and related term belong to one or more of entertainment, politics, science and technology, sports, or other suitable categories. Each entry may also comprise geographic region information about the content object or the author that authored the content object. The geographic region information may be used for regional filtering. The social-networking system 160 may use the real-time query-post log 400 to calculate the correlation coefficients for the terms of the content object with respect to each of the n-grams of the search query identified through parsing in real time. The correlation coefficient for each term of the content object may be based on a count of entries in the real-time query-post log 400 comprising a related term matching the term of the content object and a query term matching the respective n-gram of the search query. The count of entries can be updated rapidly, thus capturing breaking news and trending topics, and can be kept for a relatively short period of time, e.g., one week. Although this disclosure describes a particular real-time query-post log comprising particular information, this disclosure contemplates any suitable real-time query-post log comprising any suitable information. More information on search indexes may be found in U.S. patent application Ser. No. 14/858,195, filed 18 Sep. 2015, and U.S. patent application Ser. No. 15/680,096, filed 17 Aug. 2017, which are incorporated by reference.

In particular embodiments, the social-networking system 160 may generate the real-time query-post log 400 in the following way. The social-networking system 160 may first record, in the real-time query-post log 400, from a first plurality of client systems 130 associated with a first plurality of users of the online social network, a plurality of prior search queries each comprising a plurality of terms, over a recent time window. The recent time window may be a pre-specified period of time prior to the first time a search query is received by the social-networking system 160. As an example and not by way of limitation, the recent time window may be one hour, 24 hours, one week, two weeks, one month, or another suitable length of time. Depending on the requirement of the processing of the real-time query-post log 400, the recent time window may vary. For batch processing, the recent time window may be relatively long, e.g., two weeks or one month. For real-time processing, the recent time window may be relatively short, e.g., one hour, 24 hours, or one week. As a result, the embodiments disclosed herein may have a technical advantage of providing time-correlated search results to a user. As an example and not by way of limitation, a plurality of users may submit a search query for "super bowl lady gaga". The social-networking system 160 may determine a short time window, e.g., one week, to record these queries in the real-time query-post log 400 since the topic is popular around the time of super bowl 2017. The social-networking system 160 may then record, in the real-time query-post log 400, for each prior search query, a prior content object accessed responsive to the prior search query. Each prior content object may comprise a related term. As an example and not by way of limitation, continuing with the previous example, a plurality of users may click on one or more content objects such as news, articles, posts, videos, etc., returned by the social-networking system 160 corresponding to the search query "super bowl lady gaga". Each content object may comprise a related term. The social-networking system 160 may then store, in the real-time query-post log 400, a plurality of entries. Each entry may comprise: (1) one of the one or more prior query terms, and (2) one related term from the prior content object accessed responsive to the prior search query comprising the respective prior query term. As another example and not by way of limitation, the real-time query-post log 400 illustrated in FIG. 4 indicates that for a query term "donald", "duck", "huey", "dewey", "louie", and "trump" are five related terms; for a query term "duck", "donald", "huey", "dewey", and "louie" are four related terms. When a user submits a query containing "donald duck", the social-networking system 160 may identify a plurality of content objects matching "donald duck". The social-networking system 160 may then calculate the correlation coefficients in real-time for the related terms of the content objects with respect to "donald" and "duck" respectively. The social-networking system 160 may subsequently rank the content objects based on the correlation coefficients of the related terms. Although this disclosure describes generating particular real-time query-post logs in a particular manner, this disclosure contemplates generating any suitable real-time query-post logs in any suitable manner.

In particular embodiment, the social-networking system 160 may store an average value of the correlation coefficients between all the query terms and their related terms in the real-time query-post log 400 over the recent time window. The social-networking system 160 may then receive, from a plurality of client systems 130 associated with a plurality of users of the online social network, a plurality of new search queries comprising a plurality of terms, over a subsequent time window with respect to the recent time window. The social-networking system 160 may further identify, during the subsequent time window, a plurality of content objects associated with the online social network that match the new search queries respectively. Each identified content object may comprise one or more terms. The social-networking system 160 may recalculate, after the subsequent time window, a correlation coefficient for each related term in each identified entry of the real-time query-post log 400. Each related term may match a term contained in one of the identified content objects, respectively. The social-networking system 160 may select one or more related terms that have correlation coefficients greater than the stored average value of the correlation coefficients by a threshold value. The social-networking system 160 may therefore determine a trending topic based on the selected related terms and the corresponding query terms. As a result, the embodiments disclosed herein may have a technical advantage of organizing breaking news and trending topics to effectively provide them to a user corresponding to a user's search query. As an example and not by way of limitation, an average correlation coefficient between all the query terms and their related terms in a real-time query-post log 400 from Aug. 23, 2017 to Aug. 29, 2017 may be 0.53 and a threshold value may be pre-specified as 0.2. The social-networking system 160 may receive a plurality of new search queries comprising two terms "hurricane" and "irma" on Aug. 30, 2017. The social-networking system 160 may recalculate the correlation coefficients for "hurricane" and "irma", which may be 0.78 and 0.85 respectively. The correlation coefficients of these two terms are greater than the average correlation coefficient 0.53 by 0.25 and 0.32 respectively, which are greater than the threshold value 0.2. Thus, the social-networking system 160 may determine that a topic based on "hurricane" and "irma" is a trending topic on Aug. 30, 2017. Although this disclosure describes determining a particular trending-topic in a particular manner, this disclosure contemplates determining any suitable trending-topic in any suitable manner.

In particular embodiment, the social-networking system 160 may calculate the correlation coefficient between a term p of a content object and an n-gram of a search query q denoted by Cor(p, q) in the following way. The social-networking system 160 may first determine the expected values, or rates of appearance, of the term p and n-gram q. These may be determined by counting the number of times a related term matching term p and n-gram q appear in the real-time query-post log 400 and dividing the count by the total number of entries n. Supposing a related term matching p appears in the real-time query-post log 400 $n_p$ times, its expected value E(p) is calculated by $$E(p) = \frac{n_p}{n}.$$

Similarly, the expected value of q, appearing in the real-time query-post log 400 $n_q$ times, is calculated by $$E(q) = \frac{n_q}{n}.$$

The social-networking system 160 may additionally calculate E(pq) which is the expected value of pq, by $$E(pq) = \frac{n_{pq}}{n},$$

wherein $n_{pq}$ is a number of times the related term matching term p and the n-gram q appear in the same entry in the real-time query-post log 400. The social-networking system 160 may then calculate the variances of the term p and n-gram q. The variance of the term p, denoted by Var(p), is calculated by Var(p)=E(p)(1−E(p)). The variance of the n-gram q, denoted by Var(q), is calculated by Var(q)=E(q)(1−E(q)). The social-networking system 160 may further calculate the covariance between the term p and n-gram q, denoted by Cov(p, q), as Cov(p, q)=E(pq)−(E(p)E(q)). Covariance describes the joint variability of two variables, in other words, whether the appearance of one variable influences the appearance of another variable. The social-networking system 160 may then calculate the correlation coefficient between a term p of a content object and an n-gram of a search query q by $$Cor(p, q) = \frac{Cov(p, q)}{\sqrt{Var(p)Var(q)}}.$$

The correlation coefficient is a normalized measure of covariance that shows the strength of the relationship of the variables. A positive correlation coefficient may indicate that the appearance of term p of a content object is correlated with the appearance of a particular n-gram of a search query according to the real-time query-post log 400, and vice versa. A negative correlation coefficient may indicate the opposite. As an example and not by way of limitation, "donald duck" may be positively correlated with "mickey mouse". This means queries including "mickey mouse" may often lead to user engagement with content objects containing "donald duck". By contrast, "donald duck" may be negatively correlated with "iron man". This means that the appearance of "donald duck" in a content object may lead to a decrease in user engagement from queries including "iron man". Although this disclosure describes calculating a particular correlation coefficient in a particular manner, this disclosure contemplates calculating any suitable correlation coefficient in any suitable manner.

As an example and not by way of limitation, the social-networking system 160 may calculate the correlation coefficient between a term huey of a content object and an n-gram of a search query cluck denoted by Cor(huey, cluck) based on the example real-time query-post log 400 illustrated in FIG. 4 as follows. Suppose huey appears in the real-time query-post log 400 40 times, cluck appears 70 times, they appear in the same entry 15 times, and there are 100 total entries. The expected value $$E(\text{huey}) = \frac{40}{100} = 0.4,$$

the expected value $$E(\text{duck}) = \frac{70}{100} = 0.7,$$

and the expected value $$E(\text{huey duck}) = \frac{15}{100} = 0.15.$$

The variance Var(huey)=E(huey)(1−E(huey))=0.24, and the variance Var(duck)=E(duck)(1−E(duck))=0.21. The covariance between huey and duck is Cov(huey, duck)=E(huey duck)−(E(huey)E(duck))=0.15−0.0504=0.0996. The correlation coefficient between huey and duck is $$\text{Cor(huey, duck)} = \frac{\text{Cov(huey, duck)}}{\sqrt{\text{Var(huey)Var(duck)}}} = \frac{0.0996}{0.2245} = 0.4437.$$

Although this example describes calculating a particular correlation coefficient based on unigrams, calculating correlation coefficient can be based on n-grams of any suitable length n, including unigram, bigram, trigram, and beyond.

In particular embodiment, the social-networking system 160 may identify a plurality of content objects associated with the online social network that match the search query. Each identified content object may comprise one or more terms (e.g., text strings in a post). In particular embodiment, the social-networking system 160 may use the correlation coefficients of the one or more terms to evaluate each content object in real time. The evaluation may give a score to the content object. In the search query scenario, the evaluation scores of the identified content objects may be used to rank them. One major advantage of this real-time evaluation is that it can be performed and updated in significantly less time than typical batch processing. Many evaluations of the same content object may be performed in unison, with each evaluation based on a predictive intuition. These evaluation scores may be used in combination, e.g., with a second-stage ranking model to up-rank posts with higher evaluation scores. In particular embodiment, the social-networking system 160 may combine the evaluation scores, such as through a weighted sum, to customize the ranking based on a particular query or for a particular search scenario. As an example and not by way of limitation, searches with longer queries may be scored differently than shorter queries. As another example and not by way of limitation, searches of public content objects may be scored differently than searches of content objects authored by a user's friends. Although this disclosure describes evaluating particular content objects in a particular manner, this disclosure contemplates evaluating any suitable content objects in any suitable manner.

In particular embodiments, the social-networking system 160 may rank the identified content objects in the following way. The social-networking system 160 may first determine, with respect to each of the n-grams of the search query, the greatest correlation coefficient for the terms of each identified content object, respectively. The social-networking system 160 may then calculate an evaluation score for each identified content object by summing the greatest correlation coefficients of the terms. The social-networking system 160 may subsequently rank the identified content objects using the evaluation scores. As an example and not by way of limitation, a query "boston celtics champions" may be parsed into the n-grams "boston", "celtics", and "champions". The social-networking system 160 may identify a plurality of content objects matching the query. To score a content object, the social-networking system 160 may identify the term in the content object with the greatest correlation coefficient with respect to each query n-gram. The social-networking system 160 may calculate the correlation coefficients for each term based on the real-time query-post log 400. As another example and not by way of limitation, a content object contains several terms including "boston", "celtics", "basketball", "match", "victory", "crowd", and "team". Term "boston" has the greatest correlation coefficient, e.g., 0.97, with respect to the query n-gram "boston". Term "celtics" has the greatest correlation coefficient, e.g., 0.86, with respect to the query n-gram "celtics". Term "victory" has the greatest correlation coefficient, e.g., 0.63, with respect to the query n-gram "champions" The correlation coefficients of these three terms are then combined (0.97+0.86+0.63) as the evaluation score (2.46) for the content object. Although this disclosure describes calculating a particular evaluation score in a particular manner, this disclosure contemplates calculating any suitable evaluation score in any suitable manner.

In particular embodiment, the social-networking system 160 may use the following example pseudo code to: (1) determine, with respect to each of the n-grams of the search query, the greatest correlation coefficient for the terms of each identified content object, respectively; (2) calculate an evaluation score for each identified content object by summing the greatest correlation coefficients of the terms:

```
evalution_score_with_greatest_coefficients (query_terms_input,
related_terms_input) {
  if (query is empty) {
    return 0;
  }
  const auto counts = fetchCounts(query_terms, related_terms);
%counts for query terms and related terms%
  double result = 0;
  for (a query term q) {
    string best_related_term = "NONE";
    double best_related_term_score = 0;
```

```
    for (a related term p) {
        if (finds a related term corresponding to a query term) {
            continue;
        }
        auto score = cor(counts, q, p); %calculate correlation
coefficient based on the counts%
        if (score > best_related_term_score) {
            best_related_term_score = score;
            best_related_term = p;
        } %indicates if command finds the greatest coefficients and
corresponding related terms%
    }
    result += best_related_term_score; %summing the greatest
    coefficients%
    }
    return result;
}
```

In particular embodiments, the social-networking system 160 may only determine the greatest correlation coefficients for terms of the identified content objects that do not match the one or more n-grams of the search query. In other words, the social-networking system 160 may check to see if the term having the greatest correlation coefficient in the content object being evaluated matches a query n-gram. If so, that term may be skipped and the next term that has the greatest correlation coefficient may be used. As an example and not by way of limitation, for the query n-grams "boston", "celtics", and "champions", the social-networking system 160 may identify, for a content object comprising "boston", "eastern", "team", "celtics", "champions" and "winner", that (1) the term "boston" has the greatest correlation coefficient (e.g., 0.97) with respect to "boston", and the term "eastern" has the second greatest correlation coefficient (e.g., 0.75) with respect to "boston"; (2) the term "celtics" has the greatest correlation coefficient (e.g., 0.86) with respect to "celtics", and the term "team" has the second greatest correlation coefficient (e.g., 0.55) with respect to "warriors"; and (3) the term "champions" has the greatest correlation coefficient (e.g., 0.88) with respect to "champions", and the term "winner" has the second greatest correlation coefficient (e.g., 0.62) with respect to "champions". The social-networking system 160 may combine the correlation coefficients of terms "eastern", "team" and "winner" instead of those of terms "boston", "celtics", and "champions" to get the evaluation score because those three terms match exactly the n-grams in the query. In other words, the evaluation score may be calculated as 0.75+0.55+0.62=1.92. The intuition is that nearly every content object being evaluated may have terms matching the query n-grams by virtue of the retrieval process. Therefore, looking at the next best term may provide a more valuable correlation. Although this disclosure describes calculating a particular evaluation score in a particular manner, this disclosure contemplates calculating any suitable evaluation score in any suitable manner.

In particular embodiments, the social-networking system 160 may rank the identified content objects for the following scenarios: (1) A content object may not have the best single term but it may have many terms with lower correlation coefficients; (2) A content object may have many slightly positively correlated terms but a few strongly negatively correlated terms, and this content object may receive a lower score than a content object with a few strongly positively correlated terms and a few slightly negatively terms. The social-networking system 160 may first calculate, for each identified content object, a sum of the correlation coefficients of each term of the content object with respect to each of the n-grams of the search query, respectively. The social-networking system 160 may then calculate, for each identified content object, an evaluation score for the content object by summing the summed correlation coefficients of the one or more terms. The social-networking system 160 may subsequently rank the identified content objects using the evaluation scores. As an example and not by way of limitation, an evaluation score for a content object containing "basketball", "match", and "team" corresponding to the query n-grams "boston" and "celtics" may be calculated as follows. Term "basketball" may have a correlation coefficient of 0.73 with respect to the query n-gram "celtics", and a correlation coefficient of 0.41 with respect to the query n-gram "boston". The summed correlation coefficient for term "basketball" is 1.14. Term "match" may have a correlation coefficient of 0.57 with respect to the query n-gram "celtics", and a correlation coefficient of 0.39 with respect to the query n-gram "boston". The summed correlation coefficient for term "match" is 0.96. Term "team" may have a correlation coefficient of 0.88 with respect to the query n-gram "celtics", and a correlation coefficient of 0.74 with respect to the query n-gram "boston". The summed correlation coefficient for term "team" is 1.62. The evaluation score for the content object may be calculated as 1.14+0.96+1.62=3.82. The evaluation score calculated in this way may indicate the statistical significance of a content object. In particular embodiments, the social-networking system 160 may further divide, for each identified content object, the summed correlation coefficients by a product of a number of n-grams of the search query and a number of terms of the content object. As an example and not by way of limitation, continuing with the previous example, the evaluation score is calculated as $$\frac{3.82}{2 \times 3} = 0.6367.$$

This may average the score based on the lengths of the query and content object. Without this normalization, longer content objects may tend to have higher scores. In another variant, the social-networking system 160 may ignore the negatively correlated terms of the content objects. Although this disclosure describes calculating a particular evaluation score in a particular manner, this disclosure contemplates calculating any suitable evaluation score in any suitable manner.

In particular embodiments, the social-networking system 160 may rank the identified content objects using the real-time query-post log 400 in the following way. The social-networking system 160 may calculate, for each identified content object, an evaluation score for the content object by summing the top N correlation coefficients of one or more terms of the content object with respect to any of the n-grams of the search query. N may be a pre-specified number. The social-networking system 160 may subsequently rank the identified content objects using the evaluation scores. In this type of evaluation, the most correlated terms for the query overall may be considered. This way of calculating evaluation scores may be suitable when a single query n-gram dominates the correlation coefficient scores for a query. As an example and not by way of limitation, a query may contain the n-grams "golden state", "state warriors", "warriors stephen", and "stephen curry". Because of the recent event that the player Stephen Curry signed a new basketball shoe sponsorship deal with the company Under Armour, the correlation coefficients of terms "basketball shoe", "sponsorship deal", and "under armour" with respect to the query n-gram "stephen curry" may be greater than the correlation coefficients of some other terms such as "golden state", "tickets", and "warriors" with respect to the query n-gram "stephen curry". Suppose that there are two content objects and Nis pre-specified as 3. For the first content object, the top 3 correlation coefficients are 0.77 of "basketball shoe", 0.79 of "sponsorship deal", and 0.69 of "under armour", all corresponding to the query n-gram "stephen curry". The second content object contains "team", "warriors", and "tickets". The top 3 correlation coefficients are 0.48 of "team" with respect to the query n-gram "golden state", 0.62 of "warriors" with respect to the query n-gram "state warriors", and "0.51" of "warriors" with respect to the query n-gram "stephen curry". The evaluation score of the first content object is 2.25 obtained by summing 0.77, 0.79 and 0.69. The evaluation score of the second content object is 1.61 obtained by summing 0.48, 0.62 and 0.51. In particular embodiments, the social-networking system 160 may use different variants by using different values for N or by limiting the number of correlation coefficients a single query n-gram may be considered for calculating an evaluation score. Although this disclosure describes calculating a particular evaluation score in a particular manner, this disclosure contemplates calculating any suitable evaluation score in any suitable manner.

Processing Search Queries Based on Query-Post Associations

In particular embodiments, the social-networking system 160 may receive, from a client system 130 associated with a first user (also referred to as a "querying user") of an online social network, a search query comprising a character string. The character string may be, for example, a text string inputted into a query field on user interface of the online social network installed on the client system 130. In particular embodiments, the social-networking system 160 may parse the search query to identify one or more n-grams. The n-grams can be any length n, including unigram, bigram, trigram, and beyond. As an example and not by way of limitation, the social-networking system 160 may parse a search query "gal gadot" to identify two unigrams "gal" and "gadot", and a bigram "gal gadot". As another example and not by way of limitation, the social-networking system 160 may parse the search query "golden state warriors" to identify three unigrams "golden", "state", and "warriors", and two bigrams "golden state" and "state warriors". As another example and not by way of limitation, the social-networking system 160 may parse a search query "donald duck" to identify two unigrams "donald" and "duck". Although this disclosure describes identifying particular n-grams in a particular manner, this disclosure contemplates identifying any suitable n-grams in any suitable manner.

In particular embodiments, the prior content objects accessed responsive to the prior search query may comprise content objects that are selected, interacted with, viewed, or browsed by a user in response to a search-results interface corresponding to the prior search query. As an example and not by way of limitation, when viewing a search-results interface responsive to a particular search query, a user may select a content object by clicking-through the search result corresponding to that content object from the search-results interface. As another example and not by way of limitation, a user may interact with a content object by liking, sharing, commenting on the content object, or tagging another user to the content object. As another example and not by way of limitation, a user may view a content object by spending less than a threshold amount of time viewing (e.g., by spending less than 5 seconds viewing the content object), e.g., clicking-through the content object from the search-results interface and then quickly getting back to the search-results interface. As another example and not by way of limitation, a user may browse a content object by spending more than a threshold amount of time viewing (e.g., by spending more than 5 seconds viewing the content object), e.g., clicking-through the content object from the search-results interface and then reading the content object for a while. Although this disclosure describes accessing particular content objects responsive to the prior search query in a particular manner, this disclosure contemplates accessing any suitable content objects accessed responsive to the prior search query in any suitable manner.

In particular embodiments, the social-networking system 160 may sanitize the prior search queries and the prior content objects accessed responsive to the prior search queries. The sanitizing may comprise one or more of removing stop words in the prior search queries and the prior content objects, applying content filters to the prior search queries and the prior content objects, removing low-quality characters which are characters that are not letters or are erroneous, other suitable sanitizing processes, or any combination thereof, from the prior search queries and the prior content objects. The aforementioned sanitizing can be done either offline or in real time (i.e., at the time a query is received). The sanitizing may additionally comprise removing terms from a query-term index 300 or a real-time query-post log 400 that have appearance rate lower than a pre-specified threshold appearance rate, which may be done offline periodically, and cannot be done in real time. As an example and not by way of limitation, the social-networking system 160 may remove stop words such as "a", "the", "and", etc. As another example and not by way of limitation, the social-networking system 160 may remove explicit language as a way of applying content filters. As another example and not by way of limitation, the social-networking system 160 may remove low quality characters such as emoji and input errors. Therefore, the sanitizing may address the technical challenge of identifying one or more related terms of a plurality of content objects that are displayed in the search results. Although this disclosure describes sanitizing particular content objects in a particular manner, this disclosure contemplates sanitizing any suitable content objects in any suitable manner.

In particular embodiments, the social-networking system 160 may normalize the prior search queries and the prior content objects accessed responsive to the prior search queries. The normalizing may comprise one or more of converting the terms in the prior search queries and the prior content objects into lowercase, stemming the terms in the prior search queries and the prior content objects, performing spell correction on the terms in the prior search queries and the prior content objects, expanding abbreviations in the terms in the prior search queries and the prior content objects, removing unnecessary diacritical marks from the terms in the prior search queries and the prior content objects, unifying variant spellings of the terms in the prior search queries and the prior content objects, other suitable normalizing processes, or any combination thereof. As an example and not by way of limitation, the social-networking system 160 may convert British spelling to American spelling (e.g., converting "litre" to "liter"). As another example and not by way of limitation, the social-networking system 160 may expand an abbreviation "FB" to "Facebook". In particular embodiments, the social-networking system 160 may prefer terms that are nouns in the prior search queries and the prior content objects because using nouns may increase the confidence that users were discussing a specific entity or topic (i.e. entities or topics matching those nouns), and the probability that the terms in the prior content objects were relevant to the prior search queries. Therefore, the normalizing may address the technical challenge of identifying one or more related terms of a plurality of content objects that are displayed in the search results. Although this disclosure describes normalizing particular content objects in a particular manner, this disclosure contemplates normalizing any suitable content objects in any suitable manner.

In particular embodiments, the social-networking system 160 may extract related terms from content objects authored by one or more users of the online social network within a threshold degree of separation of the querying user for generating the query-term index 300 or real-time query-post log 400. As a result, the embodiments disclosed herein may have a technical advantage of providing search results that are personalized to a user based on the user's social graph information. As an example and not by way of limitation, the one or more users of the online social network within a threshold degree of separation of the querying user may be friends with the querying user. Accordingly, the ranking of content objects may be personalized for the querying user based on the opinions and terms expressed by the friends of the querying user. For example, an analysis of the query-term index 300 or real-time query-post log 400 may find that when a user's friends discuss James Bond, they often discuss certain actors that played the character, such as Timothy Dalton, but do not discuss other actors such as Sean Connery. Such finding may be reflected in the ranking of content objects for a query "James Bond" submitted by the user, wherein content objects containing Timothy Dalton may be ranked higher while those containing Sean Connery may be ranked lower. In particular embodiments, the social-networking system 160 may extract related terms from content objects authored by the querying user for generating the query-term index 300 or real-time query-post log 400. Accordingly, the top ranked content objects may be those that the querying user personally is likely to engage with. Although this disclosure describes generating particular query-term indexes and real-time query logs based on particular sources of content objects in a particular manner, this disclosure contemplates generating any suitable query-term indexes or real-time query logs based on any suitable sources of content objects in any suitable manner.

In particular embodiments, the social-networking system 160 may extract related terms from content objects that have privacy settings making them visible to the querying user for generating the query-term index 300 or real-time query-post log 400. As an example and not by way of limitation, content objects that have privacy settings making them visible to the querying user may be public posts. As a result, the embodiments disclosed herein may have a technical advantage of providing search results that both match a user's search query and reflect the popular topics among other users on an online social network. As another example and not by way of limitation, content objects that have privacy settings making them visible to the querying user may include posts by friends of the querying user with privacy settings of "friends only". In particular embodiments, if the extract related terms are from content objects that all are public and made by normal users, the analysis of the query-term index 300 or real-time query-post log 400 may reveal trending topics or sub-topics, or new developments related to the query. Although this disclosure describes generating query-term indexes or real-time query-post logs based on privacy settings of content objects in a particular manner, this disclosure contemplates generating query-term indexes or real-time query-post logs based on privacy settings of content objects in any suitable manner.

In particular embodiments, the social-networking system 160 may extract related terms from content objects authored by a plurality of users of the online social network from the same geographic region as the querying user for generating the query-term index 300 or real-time query-post log 400. Accordingly, the ranking of content objects may reflect opinions or importance based on the geographic region. As a result, the embodiments disclosed herein may have a technical advantage of providing search results that are personalized to a user based on the user's social graph information. For example, the related terms extracted from content objects authored by users in the respective cities of two sports teams may differ. The social-networking system 160 may generate two different query-term indexes 300 or two different query-post logs 400 for the two cities. The analysis of the two query-term indexes 300 or two query-post logs 400 may find related terms corresponding to each city have significant difference. Suppose there is a match between these two sports teams and people from these two cities submit the same query regarding the match to the social-networking system 160. Although the query is the same, the social-networking system 160 may return two different ranking lists based on the respective related terms for the two cities. Although this disclosure describes extracting terms for query-term indexes or real-time query-post logs in a particular manner, this disclosure contemplates extracting terms for query-term indexes or real-time query-post logs in any suitable manner.

Figure 5:
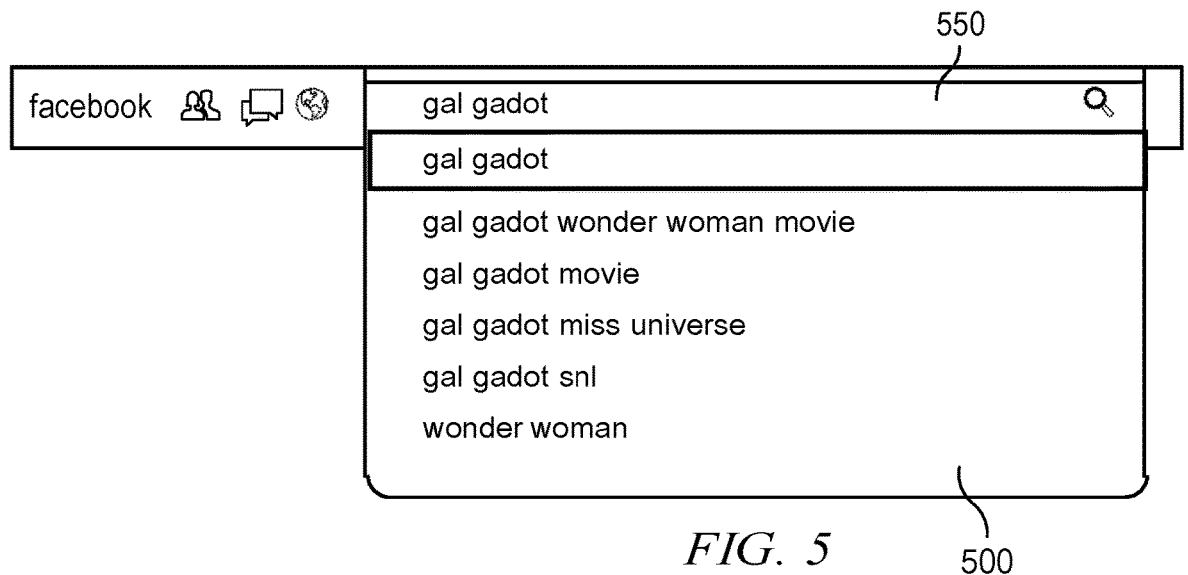
FIG. 5 illustrates an example of query suggestions.
Figure 6:
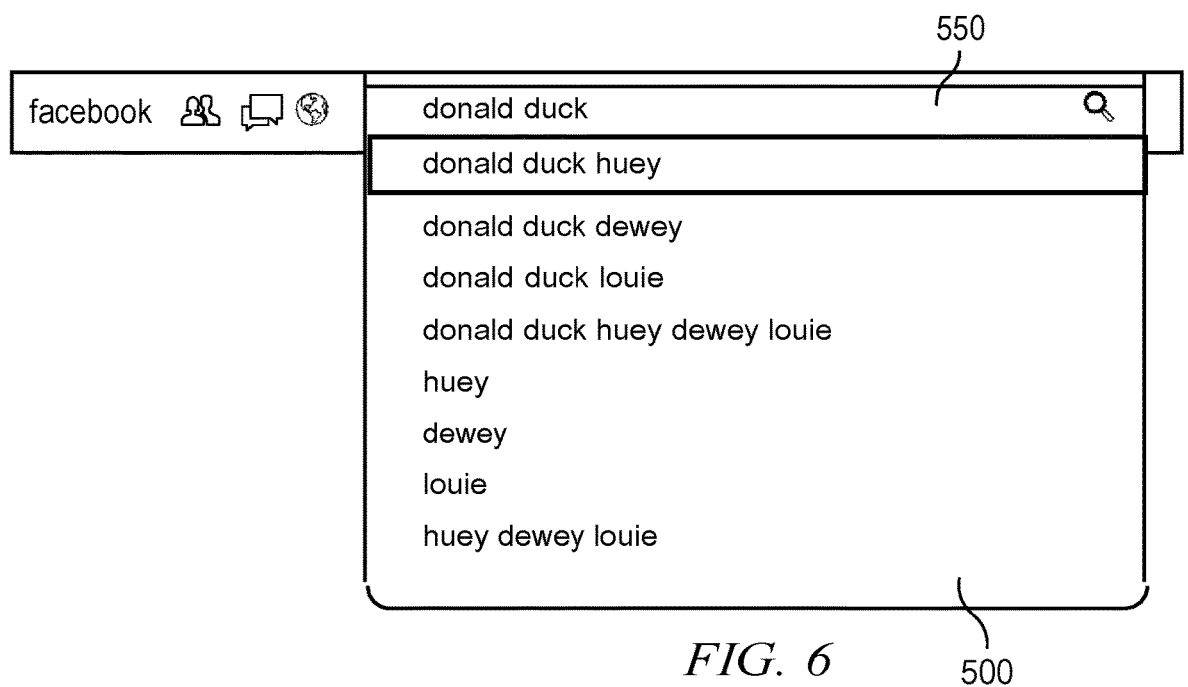
FIG. 6 illustrates another example of query suggestions.

In particular embodiments, the social-networking system 160 may select one or more related terms from the identified entries in the query-term index 300, or real-time query-post log 400, that have TF-IDF scores, or correlation coefficients, greater than a threshold score. The social-networking system 160 may then rewrite the search query based on the selected related terms. The identified content objects may match the rewritten search query, and at least a portion of the identified content objects may comprise one or more of the selected related terms. As an example and not by way of limitation, the social-networking system 160 may analyze the query-term index 300 or real-time query-post log 400 before identifying matches to a search query. To improve the relevance of identified content objects, the social-networking system 160 may append related terms with high TF-IDF scores or great correlation coefficients to the query, e.g., as a weak AND (WAND) operator. For example, if a user searches for "gal gadot", the query may be rewritten to require a fraction of the results to also contain the related term "wonder woman", based on which the social-networking system 160 may rank the identified object contents. More information on rewriting queries may be found in U.S. Pat. No. 9,367,880, issued on 14 Jun. 2016, which is incorporated herein by reference. In particular embodiments, the social-networking system 160 may further send, to the client system 130 responsive to the querying user inputting the character string, instructions for displaying one or more suggested queries. At least one of the suggested queries comprises one or more of the selected related terms. As an example and not by way of limitation, the typeahead process or query rewriting may be based on the TF-IDF scores or correlation coefficients of related terms and append the related terms to the query or replace the original query with the related terms. FIG. 5 illustrates an example of query suggestions. As shown in FIG. 5, a query "gal gadot" is entered into the search box 550 and the typeahead process may append related terms "wonder woman", "movie", "miss universe", or "snl" to the query. As a result, queries including "gal gadot wonder woman", "gal gadot wonder woman movie", "gal gadot movie", "gal gadot miss universe", or "gal gadot snl" are displayed in the drop-down menu 500. The query rewriting may replace the query with the related term "wonder woman" and display a suggested query "wonder woman" in the drop-down menu 500. FIG. 6 illustrates another example of query suggestions. As shown in FIG. 6, a query "donald duck" is entered into the search box 550 and the typeahead process may append related terms "huey", "dewey", or "louie" to the query. As a result, queries including "donald duck huey", "donald duck dewey", "donald duck louie", or "donald duck huey dewey louie" are displayed in the drop-down menu 500. The query rewriting may replace the query with the related terms "huey", "dewey", or "louie" and display suggested queries including "huey", "dewey", "louie", or "huey dewey louie" in the drop-down menu 500. Although this disclosure describes providing particular query suggestion in a particular manner, this disclosure contemplates providing any suitable query suggestion in any suitable manner.

In particular embodiments, the social-networking system 160 may use the analysis based on the query-term index 300 or real-time query-post log 400 to optimize content generation (e.g., composing posts) for a user. As an example and not by way of limitation, the social-networking system 160 may detect, by the client system 130 associated with a user of an online social network, an action of the user composing a post. The social-networking system 160 may then access the query-term index 300 or real-time query-post log 400 to identify related terms that have high TF-IDF scores or great correlation coefficients with respect to the n-grams of the post before the user submits the post. The social-networking system 160 may consequently suggest the related terms to the user so that the user may add them to boost future engagement rate from other users. The social-networking system 160 may also automatically append or tag the related terms to the post. For example, the social-networking system 160 may detect that a user is writing a post about the first 100 days of Donald Trump focusing on the health care reform. The social-networking system 160 may access a query-term index 300 or real-time query-post log 400 and determine that "immigration", "travel ban", "golf", "ivanka trump", etc., are highly related terms to "donald trump". The social-networking system 160 may then suggest the user to tag these terms to the post before submitting it so that a plurality of other users on an online social network may click on, view, or read the post. Although this disclosure describes generating particular content objects in a particular manner, this disclosure contemplates generating any suitable content objects in any suitable manner.

Figure 7:
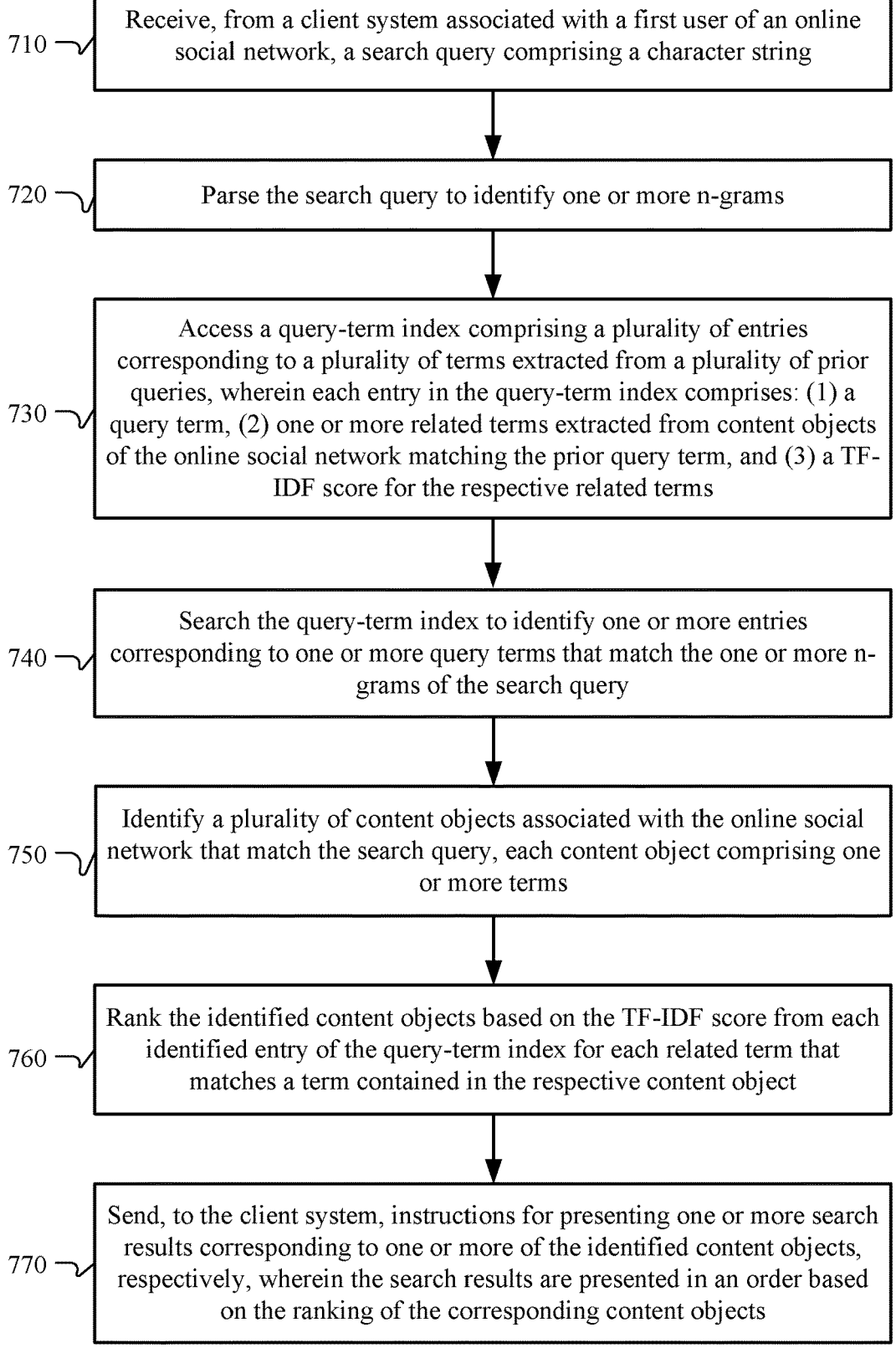
FIG. 7 illustrates an example method for identifying and ranking search results based on a query-term index.

FIG. 7 illustrates an example method 700 for identifying and ranking search results based on a query-term index 300. The method may begin at step 710, where the social-networking system 160 may receive, from a client system 130 associated with a first user of an online social network, a search query comprising a character string. At step 720, the social-networking system 160 may parse the search query to identify one or more n-grams. At step 730, the social-networking system 160 may access a query-term index 300 comprising a plurality of entries corresponding to a plurality of terms extracted from a plurality of prior queries, wherein each entry in the query-term index 300 comprises: (1) a query term, (2) one or more related terms extracted from content objects of the online social network matching the query term, and (3) a TF-IDF score for the respective related terms. At step 740, the social-networking system 160 may search the query-term index 300 to identify one or more entries corresponding to one or more query terms that match the one or more n-grams of the search query. At step 750, the social-networking system 160 may identify a plurality of content objects associated with the online social network that match the search query, each content object comprising one or more terms. At step 760, the social-networking system 160 may rank the identified content objects based on the TF-IDF score from each identified entry of the query-term index 300 for each related term that matches a term contained in the respective content object. At step 770, the social-networking system 160 may send, to the client system 130, instructions for presenting one or more search results corresponding to one or more of the identified content objects, respectively, wherein the search results are presented in an order based on the ranking of the corresponding content objects. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for identifying and ranking search results based on a query-term index 300, including the particular steps of the method of FIG. 7, this disclosure contemplates any suitable method for identifying and ranking search results based on a query-term index 300, including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
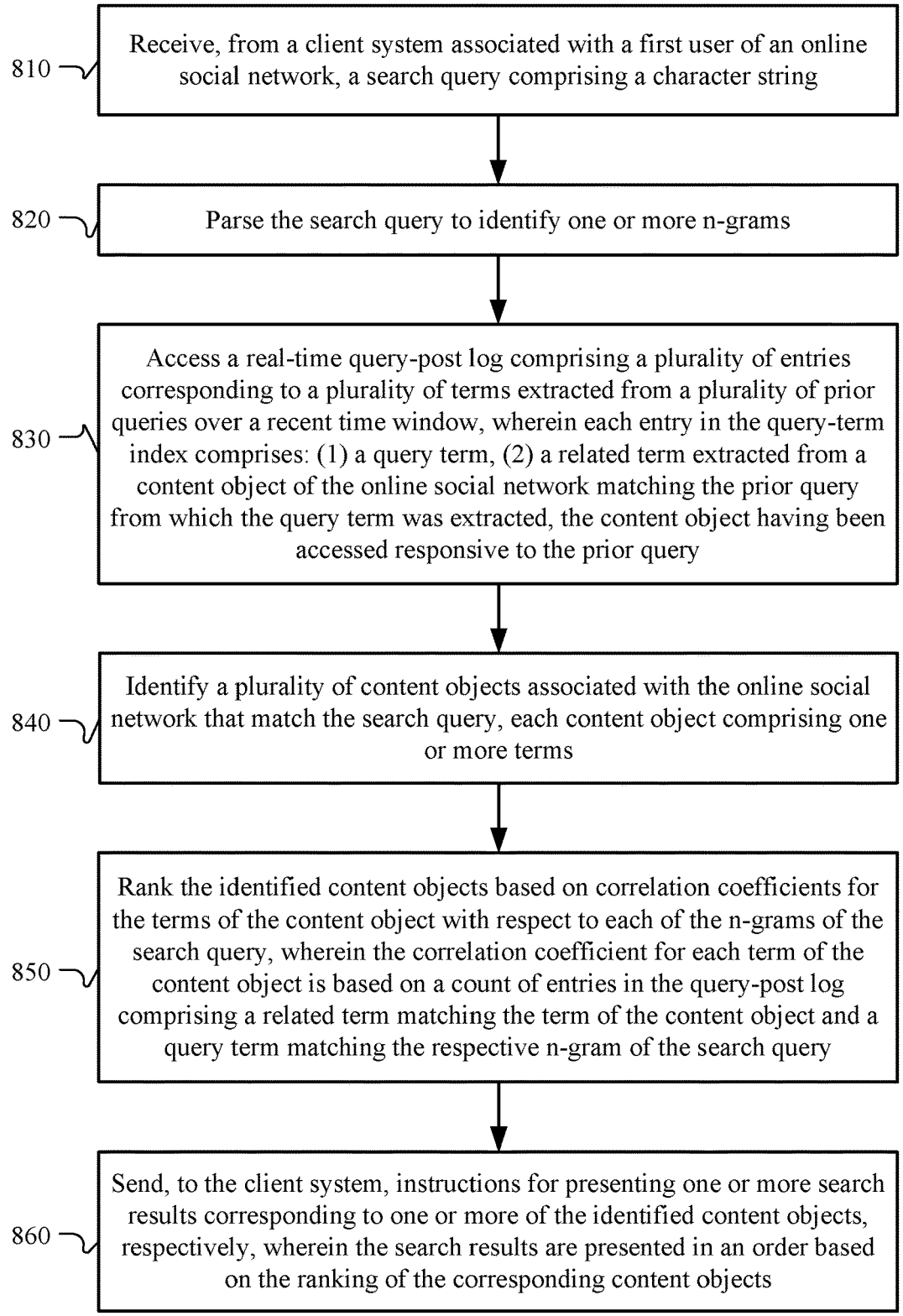
FIG. 8 illustrates an example method for identifying and ranking search results based on a real-time query-post log.

FIG. 8 illustrates an example method 800 for identifying and ranking search results based on a real-time query-post log 400. The method may begin at step 810, where the social-networking system 160 may receive, from a client system 130 associated with a first user of an online social network, a search query comprising a character string. At step 820, the social-networking system 160 may parse the search query to identify one or more n-grams. At step 830, the social-networking system 160 may access a real-time query-post log 400 comprising a plurality of entries corresponding to a plurality of terms extracted from a plurality of prior queries over a recent time window, wherein each entry in the query-post log 400 comprises: (1) a query term, and (2) a related term extracted from a content object of the online social network matching the prior query from which the query term was extracted, the content object having been accessed responsive to the prior query. At step 840, the social-networking system 160 may identify a plurality of content objects associated with the online social network that match the search query, each content object comprising one or more terms. At step 850, the social-networking system 160 may rank the identified content objects based on correlation coefficients for the terms of the content object with respect to each of the n-grams of the search query, wherein the correlation coefficient for each term of the content object is based on a count of entries in the query-post log 400 comprising a related term matching the term of the content object and a query term matching the respective n-gram of the search query. At step 860, the social-networking system 160 may send, to the client system 130, instructions for presenting one or more search results corresponding to one or more of the identified content objects, respectively, wherein the search results are presented in an order based on the ranking of the corresponding content objects. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for identifying and ranking search results based on a real-time query-post log 400, including the particular steps of the method of FIG. 8, this disclosure contemplates any suitable method for identifying and ranking search results based on a real-time query-post log 400, including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 9:
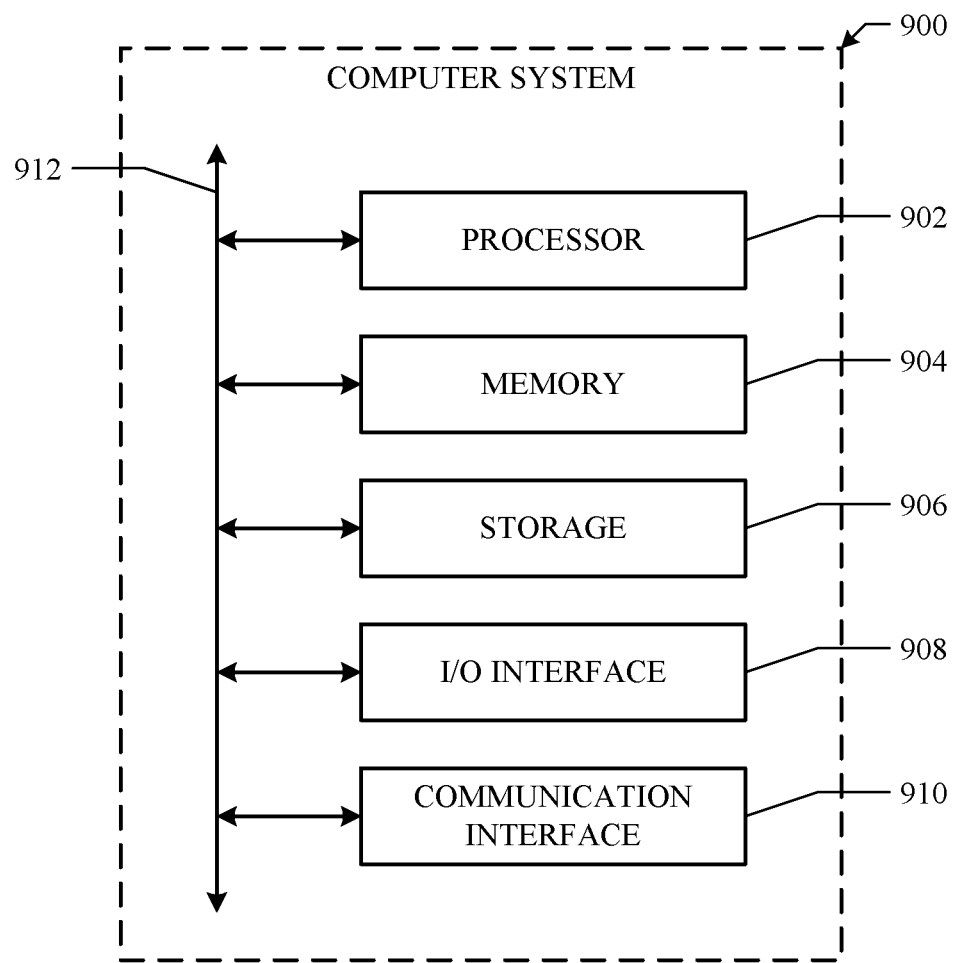
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system ~00 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:

receiving, from a client system associated with a first user of an online social network, a search query comprising a character string;

parsing the search query to identify one or more n-grams;

recording, in a query-post log, a plurality of prior search queries and prior content objects accessed responsive to the prior search queries, wherein each of the prior search queries includes a prior query term;

extracting related terms from the prior content objects, each of the related terms being associated with one of the prior search queries;

calculating a term frequency-inverse document frequency (TF-IDF) score for each of the related terms with respect to at least one of the prior content objects;

storing, in a query-term index, a plurality of entries, wherein each entry comprises: (1) a respective query term of the prior query terms, (2) one or more respective related terms of the related terms that are extracted from one or more of the prior content objects that are accessed responsive to the respective query term, and (3) the one or more of the calculated TF-IDF scores of the one or more respective related terms;
accessing the query-term index;
searching the query-term index to identify one or more entries corresponding to one or more query terms that match the one or more n-grams of the search query;
identifying a plurality of content objects associated with the online social network that match the search query, each content object of the plurality of content objects comprising one or more terms;
ranking the identified content objects based on the TF-IDF score from each identified entry of the query-term index for each related term that matches a term of the terms contained in the identified content objects; and
sending, to the client system, instructions for presenting one or more search results corresponding to one or more of the identified content objects, respectively, wherein the search results are presented in an order based on the ranking of the corresponding content objects.

2. The method of claim 1, further comprising generating the query-term index, the generating comprising:
recording, in the query-post log, from a plurality of client systems associated with a plurality of users of the online social network, the plurality of prior search queries over a time window;
recording, in the query-post log, for each prior search query, one or more of the prior content objects accessed responsive to the prior search query, each prior content object comprising one or more of the related terms; and
calculating, for each pair of query terms and related terms, at least one of the TF-IDF scores for the related terms with respect to the prior content objects matching the query terms of the pair.

3. The method of claim 2, further comprising sanitizing the prior search queries and the prior content objects accessed responsive to the prior search queries, wherein the sanitizing comprises one or more of:
removing stop words in the prior search queries and the prior content objects;
applying content filters to the prior search queries and the prior content objects; or
removing low-quality characters from the prior search queries and the prior content objects.

4. The method of claim 2, further comprising normalizing the prior search queries and the prior content objects accessed responsive to the prior search queries, wherein the normalizing comprises one or more of:
converting the terms in the prior search queries and the prior content objects into lowercase;
stemming the terms in the prior search queries and the prior content objects;
performing spell correction on the terms in the prior search queries and the prior content objects;
expanding abbreviations in the terms in the prior search queries and the prior content objects;
removing unnecessary diacritical marks from the terms in the prior search queries and the prior content objects; or
unifying variant spellings of the terms in the prior search queries and the prior content objects.

5. The method of claim 2, wherein the time window is pre-specified period of time prior to a current time.

6. The method of claim 2, wherein the prior content objects accessed responsive to the prior search query comprise content objects that are selected, interacted with, viewed, or browsed by a user in response to a search-results interface corresponding to the prior search query.

7. The method of claim 1, wherein ranking the identified content objects comprises:
determining, for each related term from each identified entry in the query-term index, a weight for the related term based on the TF-IDF score of the related term;
tuning a ranking algorithm by applying the determined weight of each related term to the ranking algorithm; and
ranking the identified content objects using the tuned ranking algorithm, wherein the ranking is based on whether one or more of the related terms are contained in the content object and the respective weights of the one or more related terms.

8. The method of claim 1, wherein the prior content objects are authored by one or more second users of the online social network within a threshold degree of separation of the first user.

9. The method of claim 1, wherein the prior content objects are authored by the first user.

10. The method of claim 1, wherein the prior content objects have privacy settings making the prior content objects visible to the first user.

11. The method of claim 1, wherein the the prior content objects are authored by a plurality of users of the online social network from the same geographic region as the first user.

12. The method of claim 1, further comprising:
selecting one or more of the related terms from one or more of the identified entries in the query-term index that have one or more of the TF-IDF scores greater than a threshold score.

13. The method of claim 12, further comprising:
rewriting the search query based on the selected one or more related terms;
wherein the identified content objects match the rewritten search query, and wherein at least a portion of the identified content objects comprise one or more of the selected related terms.

14. The method of claim 12, further comprising:
sending, to the client system responsive to the first user inputting the character string, instructions for displaying one or more suggested queries, wherein at least one of the suggested queries comprises one or more of the selected one or more related terms.

15. The method of claim 1, wherein the identified one or more n-grams are unigrams or bigrams.

16. The method of claim 15, wherein ranking the identified content objects comprises:
determining, for each related term from each identified entry in the query-term index corresponding to a query term that matches a unigram of the search query, a weight of a first pre-specified value for the related term corresponding to the query term matching the unigram;
determining, for each related term from each identified entry in the query-term index corresponding to a query term that matches a bigram of the search query, a weight of a second pre-specified value for the related term corresponding to the query term matching the bigram;
tuning a ranking algorithm by applying the determined weight of the first or second pre-specified values of each related term to the ranking algorithm; and
ranking the identified content objects using the tuned ranking algorithm, wherein the ranking is based on whether one or more of the related terms are contained in the content object and the respective weights of the first or second pre-specified values of the one or more related terms.

17. One or more computer-readable non-transitory storage media embodying software that is operable when executed to:
receive, from a client system associated with a first user of an online social network, a search query comprising a character string;
parse the search query to identify one or more n-grams;
record, in a query-post log, a plurality of prior search queries and prior content objects accessed responsive to the prior search queries, wherein each of the prior search queries includes a prior query term;
extract related terms from the prior content objects, each of the related terms being associated with one of the prior search queries;
calculate a term frequency-inverse document frequency (TF-IDF) score for each of the related terms with respect to at least one of the prior content objects;
store, in a query-term index, a plurality of entries, wherein each entry comprises: (1) a respective query term of the prior query terms, (2) one or more respective related terms of the related terms that are extracted from one or more of the prior content objects that are accessed responsive to the respective query term, and (3) the one or more of the calculated TF-IDF scores of the one or more respective related terms;
access the query-term index;
search the query-term index to identify one or more entries corresponding to one or more query terms that match the one or more n-grams of the search query;
identify a plurality of content objects associated with the online social network that match the search query, each content object of the plurality of content objects comprising one or more terms;
rank the identified content objects based on the TF-IDF score from each identified entry of the query-term index for each related term that matches a term of the terms contained in the identified content objects; and
send, to the client system, instructions for presenting one or more search results corresponding to one or more of the identified content objects, respectively, wherein the search results are presented in an order based on the ranking of the corresponding content objects.

18. A system comprising: one or more processors; and a non-transitory memory coupled to the one or more processors comprising instructions executable by the one or more processors, the one or more processors operable when executing the instructions to:
receive, from a client system associated with a first user of an online social network, a search query comprising a character string;
parse the search query to identify one or more n-grams;
record, in a query-post log, a plurality of prior search queries and prior content objects accessed responsive to the prior search queries, wherein each of the prior search queries includes a prior query term;
extract related terms from the prior content objects, each of the related terms being associated with one of the prior search queries;
calculate a term frequency-inverse document frequency (TF-IDF) score for each of the related terms with respect to at least one of the prior content objects;
store, in a query-term index, a plurality of entries, wherein each entry comprises: (1) a respective query term of the prior query terms, (2) one or more respective related terms of the related terms that are extracted from one or more of the prior content objects that are accessed responsive to the respective query term, and (3) the one or more of the calculated TF-IDF scores of the one or more respective related terms;
access the query-term index;
search the query-term index to identify one or more entries corresponding to one or more query terms that match the one or more n-grams of the search query;
identify a plurality of content objects associated with the online social network that match the search query, each content object of the plurality of content objects comprising one or more terms;
rank the identified content objects based on the TF-IDF score from each identified entry of the query-term index for each related term that matches a term of the terms contained in the identified content objects; and
send, to the client system, instructions for presenting one or more search results corresponding to one or more of the identified content objects, respectively, wherein the search results are presented in an order based on the ranking of the corresponding content objects.

* * * * *